United States Patent [19]

Henbest

[11] 4,058,483

[45] Nov. 15, 1977

[54] ADSORBENT MATERIAL

[75] Inventor: Richard George Cleveland Henbest, Stockton-on-Tees, England

[73] Assignee: Imperial Chemical Industries Limited, London, England

[21] Appl. No.: 695,415

[22] Filed: June 14, 1976

[30] Foreign Application Priority Data

June 13, 1975 United Kingdom ............... 25380/75

[51] Int. Cl.$^2$ ............................................. B01J 21/18
[52] U.S. Cl. .................................... 252/446; 252/447
[58] Field of Search ................................ 252/447, 446

[56] References Cited

U.S. PATENT DOCUMENTS

| 795,562 | 7/1905 | Tatti | 252/447 X |
|---|---|---|---|
| 1,520,437 | 12/1924 | Pipkin | 252/447 X |
| 3,276,186 | 10/1966 | Hronas et al. | 252/447 X |
| 3,795,730 | 3/1974 | Kalvinskas | 252/447 X |
| 3,833,357 | 9/1974 | Bianchi et al. | 252/447 X |

FOREIGN PATENT DOCUMENTS 247,241  2/1926  United Kingdom ................ 252/446

Primary Examiner—J. Poer
Assistant Examiner—William G. Wright
Attorney, Agent, or Firm—Cushman, Darby & Cushman

[57] ABSTRACT

An adsorptive material, useful for removing substances from gases and liquids is in discrete pieces, each comprising an adsorptive carbon and an inorganic adsorptive oxide in a mutual weight proportion between 1:5 and 5:1, and the discrete pieces having been formed by a wet method.

9 Claims, No Drawings

ADSORBENT MATERIAL

This invention relates to an adsorbent material.

Removal of substances from fluids in which they are present in small concentrations, for example for purifying air or water, has commonly been effected by adsorption on active carbon. Such carbon is often made by pyrolysing organic material such as coal, pitch, cellulose, synthetic polymers and animal products, followed by comminuting the product to the required particle size range. Cominution produces a proportion of undersize particles, which are less generally useful than larger particles, especially when the fluid is to be treated continuously. The larger particles produced by comminution may lack cohesion in use and/or regeneration and therefore may need to be relatively often replaced by raw material.

We have now found that a particulate carbon adsorbent material of wide applicability and good cohesion results if an adsorptive carbon is combined with an inorganic adsorptive oxide, especially if those components are brought together by a defined method.

According to the invention an adsorptive material is in discrete pieces comprising an adsorptive carbon and an inorganic adsorptive oxide.

The discrete pieces may be for example spheres, spheroids or cylinders or (less preferably) irregular pieces, of sizes suitable for a stationary contact bed, for example having maximum dimensions in the range 1–50 mm. For a suspensible contact bed the pieces are suitably in the range 0.1 to 2.0 mm. The pieces may if desired have a definite mechanical structure, for example in the form of rods, tubes, honeycombs, tiles or perforated sheets, or coatings on the surface of a structure of, for example, metal, ceramic or textile. Pieces that have been formed by a wet method, especially granulation or extrusion are especially preferred.

The adsorptive carbon can be of any type or origin and may in known manner carry reactive materials such as metal salts. Typically the specific surface of the adsorptive carbon is in the range 100 to 2000 $m^2/g$. Its pore radius on average is typically in the range 10 to 100 Angstrom units and this may lie in a broad, medium or narrow distribution. It may be hydrophilic or hydrophobic. More than one type of adsorptive carbon may be present in each discrete piece, in order to broaden the range of substances adsorbed or the field of application of the adsorbent. The carbon adsorbent may have been activated before or after combining it with the inorganic adsorbent or partly before and partly after.

The particles of adsorptive carbon within the pieces may conveniently be undersize by-product material from the manufacture of coarse particles by comminution, or may be recovered carbon powder from a process in which coarse carbon particles break up in use. The pieces may also be coarse carbon particles strengthened by combination with the inorganic oxide.

The inorganic adsorptive oxide preferably includes a proportion, preferably at least 50% w/w, of polymerised or copolymerised oxides. Such oxides are effective to bind the constituents of the pieces together and they also can provide a useful adsorptive property in their own right. Such oxides preferably constitute at least 90% w/w of the inorganic adsorptive oxide component of the pieces. Suitable oxides occur in all groups of the Periodic Table. Those from Groups II, III, IV, VI and VIII are especially useful, for example the oxides of aluminium, silicon, chromium and iron and combinations thereof, for example clays and hydraulic cements. Preferably the inorganic adsorptive oxide component is a dehydrated gel. Its specific surface is suitably in the range 1 to 2000 $m^2/g$ and its mean pore radius in the range 5 to 10000 Angstrom units.

The mutual weight proportions of adsorptive carbon and inorganic adsorptive oxide are suitably between 1:5 and 5:1, especially between 1:2 and 2:1. It appears to be desirable for the pieces to consist of carbon particles in a matrix of inorganic oxide; the oxide does not seriously block access to the very fine pores which provide most of the adsorbing power of the carbon. The pore volume is suitably at least 0.1 ml/g in pores greater than 500 Angstrom units in radius, and at least 0.2 ml/g in pores above 40 Angstrom units in diameter. In addition the discrete pieces may contain other materials such as involatile diluents or binders, or compounds thermally decomposable to adsorptive carbon or inorganic oxide. They may also contain volatile compounds such as water, bases or acids, which may have the effect of modifying the adsorptive properties of the carbon or inorganic oxide or both.

The invention provides also a method of making the adsorptive material which comprises mixing adsorptive carbon and/or precursor thereof with a solution and/or colloidal dispersion of an inorganic oxide or precursor thereof, forming the mixture into shaped discrete pieces, and insolubilising the inorganic oxide or precursor; heating the discrete pieces, to drive out solvent and develop adsorptive surfaces thereon, may then be carried out if required.

The adsorptive carbon starting material may be any of those mentioned hereinbefore. As examples of carbon precursors there may be mentioned the organic materials set out in the above introductory paragraph and more or less carbonised forms thereof. A useful starting material is an adsorptive carbon having adsorbed on it organic material capable of being converted to carbon thermally and/or chemically.

The inorganic oxide may be introduced as such in the form of a colloidal dispersion such as a silica sol, an alumina sol or analogous sols of the other usable elements. More conveniently a precursor is used, such as an alcoholate or an alkali metal salt (when the oxide is acidic or amphoteric) or a salt in which the inorganic element is present as a cation. If a salt having an oxidising anion such as nitrate or sulphate is used, the procedure should be designed to avoid hazardous oxidation of the carbon component or its precursor.

In addition the mixture may contain other substances such as other adsorbents, binders, extrusion aids (such as clay), viscosity adjusters (such as soluble polymers) and transient blocking agents effective to fill the pores of the carbon and thus decrease its capacity to adsorb liquid from the solution, which would increase the viscosity of the mixture. Transient blocking agents also may be useful in preventing inorganic oxidic material from entering the pores of the carbon.

The mixture can be shaped for example by wet granulation, compaction between rollers, extrusion, moulding or coating on a substrate. Preferably the mixture is shaped wet; the proportion of liquid in the mixture is chosen to give the consistency required for the method to be used, taking into account that liquid tends to be withdrawn from the mixture by adsorption by the carbon, thus stiffening the mixture. If desired, however, the carbon and solution mixture may be allowed to dry out, shaped dry, re-wetted and allowed to set.

Insolubilisation of the inorganic oxide can be carried out by physical means such as heating, if a colloidal dispersion is used, but is preferably effected chemically. If a colloidal dispersion is used, it can be insolubilised by flocculation, using an acid or alkaki according to the electrical charge on the dispersion or by an electrolyte, preferably polyvalent. If a solution of a salt is used, insolubilisation is preferably by acid or alkali, as appropriate; in this event the concentration and acidic or basic strength of the reagent used should be sufficient to produce the insoluble material within the piece, rather than to allow the salt to re-dissolve and react outside the piece. For example, when an alkali metal salt is used, the acid should be at least as strong as acetic acid and should be at a concentration of at least 4% w/w if used in aqueous solution. In this step ammonium salts or the strong acids are highly effective, possibly because the acidic strength of the cation $NH_4^+$ is about the same as that of acetic acid. Acids capable of co-polymerisation with the inorganic oxide, such as phosphoric acid, appear to produce pieces of high strength. Very suitably treatment with acid or alkali is accompanied by treatment with a flocculating ion. Thus, for example, an aluminium salt is highly effective.

After insolubilisation the pieces are washed, if soluble materials are to be removed, and then dried. If a carbon precursor is present, or if the adsorptive properties of the inorganic oxide are required in addition to those of the carbon, a calcination may be carried out under conditions of temperature, time and atmosphere appropriate to the intended use of the adsorbent. Chemically or catalytically active substances such as oxidising or reducing agents, acids, bases and salts may be added if required. Generally the activation and regeneration treatments proposed for use in making active carbons and active inorganic oxides can be applied to the absorbent according to the invention.

The invention further provides processes of treating gases and liquids to remove substances from them, using the adsorptive material according to the invention. Examples of such processes include:
  removal of odours from gaseous effluents:
  removal of dampness and odours from enclosed spaces such as furniture, footwear;
  removal of sulphur compounds from natural gas;
  removal of traces of organic matter from water;
  removal and recovery of salts present in low concentrations in aqueous effluents, for example phosphates from domestic or agricultural waste water.

EXAMPLE 1 a. Two hundred grams of active carbon powder ("HYDRODARCO B", specific surface about 600 m²/g, supplied by ICI United States Inc.) were stirred in a "Kenwood Chef" planetary mixer with 210 ml of a solution of sodium silicate made by diluting 168 ml of L96 grade sodium silicate (11.2% $Na_2O$, 31.9% $SiO_2$, S.G. 1.48) (ICI) with 42 ml water. (The names "HYDRODARCO" and "KENWOOD CHEF" are believed to be Registered Trade Marks). The mixture was a moist powder, which gradually formed into approximately spherical granules. Mixing was stopped when the granules reached a diameter of about 2mm. The granules were then spread out, allowed to dry in air for 30 minutes and sieved to remove granules greater than 3.35 mm and smaller than 1.0 mm. The selected fraction was immersed in 20% sulphuric acid for 72 hours, then removed, washed with water and dried at 150° C. The resulting granules were mechanically strong, whether dry or in the presence of liquid water; their crushing strength as measured by applying a dead weight load was 0.74 kg per granule. (b) Preparation (a) was repeated except that 17.6% w/w phosphoric acid $H_3PO_4$ was used instead of sulphuric acid. The crushing strength of the granules produced was 0.9 kg per granule.

EXAMPLE 2

One hundred grams of active carbon powder (decolorising active charcoal powder supplied by BDH Ltd) and 213 ml of the dilute sodium silicate solution used in Example 1 were mixed and granulated as in Example 1. (This carbon starting material had a specific surface of about 1000 m²/g and consequently absorbed more water and required about twice as much sodium silicate to produce a granulated mixture as the carbon used in Example 1. In order to make granules having a lower content of silica a more dilute sodium silicate would be used). The granules were spread out and allowed to dry in air for 15 minutes. Samples were then immersed in various reagents to insolubilise the silicate, then washed, dried at 100° C and subjected singly to a dead weight load to measure their crushing strength. Table 1 shows the crushing strengths in kg per granule for the various products obtained.

Table 1

| Reagent | Concentration % w/w | Granule crushing strength Kg |
|---|---|---|
| Acetic acid | 2 | too low to measure |
|  | 5 | 0.16 |
|  | 20 | 0.26 |
|  | 100 | 0.20 |
| Ammonium sulphate | 2 | too low to measure |
|  | 5 | 0.11 |
|  | 50 | 0.33 |
| Ammonium chloride | 2 | 0.07 |
|  | 5 | 0.28 |
|  | 20 | 0.40 |
| Sulphuric acid | 2 | 0.04 |
|  | 5 | 0.08 |
|  | 35 | 0.23 |
|  | 50 | 0.30 |

EXAMPLE 3

Two hundred grams of active carbon powder ("HYDRODARCO H", supplied by ICI United States Inc.) was mixed with 30 g of bentonite and 195 ml of sodium silicate solution (L96 solution diluted with an equal volume of water). The resulting stiff paste was extruded to give a rod 1.3 mm in diameter, which was then cut into short pieces of length 1 to 5 mm. These were dried for 30 minutes in air and immersed overnight in 50% w/w phosphoric acid $H_3PO_4$, then washd with water and dried at 200° C. The resulting pieces were mechanically strong, whether dry or in the presence of water. The carbon content, measured by loss on ignition at 800° C, was 61%.

EXAMPLE 4

Adsorption behaviour a. To 100 ml of an aqeuous solution of methylene blue (0.2 g/l), the optical density of which (as measured in a 2.5 mm cell in an EEL absorptiometer) was taken as 100%, were added 1 g of the granular material prepared in Example 1(a). The optical density of the supernatant solution was found after 120 minutes to be 12.5%.

In comparison a sample of conventional active carbon granules ("HYDRODARCO DXL-0-4649", supplied by ICI United States Inc.), was found to decrease the optical density to 20%.

b. To a mixture of 100 ml of an aqueous solution of potassium iodide and iodine (about 3g iodine per liter) with 10 ml of 5% w/w HCl there was added 0.85 g of extruded material as prepared in Example 3. The concentration of iodine in the supernatant solution was found after 180 minutes to have decreased from its initial measured value 2.66 g/l to 0.32 g/l.

EXAMPLE 5

Regeneration

For test in an adsorption/regeneration cycle a carbon/silica adsorbent was prepared by granulating 200 g of active carbon "HYDRODARCO C", specific surface 477 m²/g, supplied by ICI United States Inc.) with 225 ml of sodium silicate solution made by diluting L96 grade sodium silicate with 10% w/w of water. The granules were alowed to dry in air for 30 minutes and sieved to remove granules greater than 3.35 mm and smaller than 1.0 mm. The selected fraction was immersed in 20% w/w phosphoric acid $H_3PO_4$ overnight, washed with water and dried at 200° C.

The cycle consisted of the following stages
  i. saturation with methylene blue from concentrated aqueous solution;
  ii. drying at 100° C;
  iii. heating in a nitrogen stream that had been humidified by bubbling through water at 75° C. This was carried out in a furnace. The temperature was raised to 850° C gradually over 90 minutes, held at 850° C for 15 minutes, then allowed to cool to 100° C;
  iv. allowing to cool from 100° C to room temperature in air.

The specific surface, bulk density, weight loss on ignition and adsorption behaviour before and after 4 cycles are set out in Table 2. (Adsorption behaviour was determined by the method of Example 4(a) using 1.75 g of absorbent per 100 ml of methylene blue solution and allowing 240 minutes for adsorption to take place. It is expressed as the percentage optical density of the supernatant solution after adsorption; a larger number signifies decreased efficiency).

Table 2

| Adsorbent | Specific surface m²/g | Bulk density g³cc | Ignition less % w/w | Optical density % |
|---|---|---|---|---|
| Fresh | 500 | 0.50 | 50.7 | 29 |
| After 4 cycles | 280 | 0.51 | 50.0 | 35 |

It is evident that the material maintains its properties well under regeneration.

I claim:

1. A method of making an adsorptive material which is in shaped discrete pieces comprising mixing active carbon powder with an aqueous solution of sodium silicate to form a moist mixture, forming the moist mixture into shaped discrete pieces, drying the pieces, immersing the pieces in a silicate-insolubilizing reagent until the silicate-content of the pieces has become insolubilized, washing the pieces with water, and drying the pieces at a temperature of at least 100° C.

2. A method as in claim 1, wherein the moist mixture is formed into granules.

3. A method as in claim 1, wherein the moist mixture is formed into the shape of rods.

4. A method as in claim 1, wherein the silicate-insolubilizing reagent is sulphuric acid.

5. A method as in claim 1, wherein the silicate-insolubilizing reagent is acetic acid.

6. A method as in claim 1, wherein the silicate-insolubilizing reagent is ammonium sulphate.

7. A method as in claim 1 wherein the silicate-insolubilizing reagent is phosphoric acid.

8. A method as in claim 1 wherein the silicate-insolubilizing reagent is ammonium chloride.

9. A method as in claim 1 wherein the ratio of carbon powder to sodium silicate in terms of dry weight is from about 3:1 to about 1:1.

* * * * *